(12) United States Patent
Gilson

(10) Patent No.: US 6,552,094 B1
(45) Date of Patent: Apr. 22, 2003

(54) RUBBER COMPOSITION AND GOODS

(75) Inventor: Robin B. Gilson, Alexandria, VA (US)

(73) Assignee: Vulcana, Inc., Alexandria, VA (US)

( * ) Notice: Subject to any disclaimer, the term of this patent is extended or adjusted under 35 U.S.C. 154(b) by 0 days.

(21) Appl. No.: 08/896,882

(22) Filed: Jul. 18, 1997

(51) Int. Cl.[7] .................................. C08J 11/04
(52) U.S. Cl. ..................... 521/41; 521/40; 521/40.5; 428/903.3; 264/37
(58) Field of Search ................ 521/40.5, 40, 41; 428/903.3; 264/37

(56) References Cited

U.S. PATENT DOCUMENTS

| | | | | |
|---|---|---|---|---|
| 4,341,667 A | * | 7/1982 | Lal et al. ...................... | 521/41 |
| 5,356,939 A | * | 10/1994 | Burrowes et al. .......... | 521/44.5 |
| 5,359,007 A | * | 10/1994 | Oliveira De Cunha Lima .. | 525/232 |
| 5,514,721 A | * | 5/1996 | Hart ........................... | 521/41 |

* cited by examiner

*Primary Examiner*—James J. Seidleck
*Assistant Examiner*—Olga Asinovsky
(74) *Attorney, Agent, or Firm*—Brinks Hofer Gilson & Lione

(57) ABSTRACT

A new rubber composition for use in clothing and fashion accessories, is provided. The new rubber composition includes 30–70% by weight devulcanized, recycled rubber, and most preferably, devulcanized, recycled tire rubber.

24 Claims, 3 Drawing Sheets

RUBBER COMPOSITION AND GOODS

BACKGROUND OF THE INVENTION

This invention relates generally to a new and improved rubber composition that includes a substantial amount of devulcanized, recycled tire rubber for use in making clothing and fashion accessories and includes a method for using the novel rubber composition to make clothing and fashion accessories.

Billions of pounds of rubber are used every year in the United States. The largest single end use for rubber is automobile tires. After a rubber tire has reached the end of its useful life, the tire is most often discarded to a dump or landfill. In fact, there are landfill sites that are full of millions of tires from previous consumption. These tire piles create several hazards. They are breeding grounds for rats, bugs, such as mosquitoes which carry encephalitis, and other vermin. In some areas, old tires are burned for energy. However, this pollutes the environment and there is not a cost effective method for cleaning. Also, tire piles have been known to catch on fire and often can burn and smolder for weeks thereby polluting the environment and creating a health hazard to surrounding communities.

While rubber clothing and fashion accessories have been around for several years, they have not been made from devulcanized, recycled rubber, and in particular, devulcanized, recycled tire rubber, or by using the method of this invention.

SUMMARY OF THE INVENTION

It is a principal objective of the present invention to provide a rubber composition that is made from substantially devulcanized, recycled rubber and can be used to make clothing and fashion accessories.

It is a further object of this invention to provide a recycled rubber composition that is durable and retains its shape, and is made from substantially devulcanized, recycled rubber.

It is a further object of this invention to provide a recycled rubber composition that is made from substantially devulcanized, recycled tire rubber.

It is a further object of this invention to provide a method for using the rubber composition to produce clothing and fashion accessories.

It is a further object of this invention to provide a use for old tire rubber that does not pollute the environment and helps to eliminate the hazards of used tire piles.

These and other features and advantages of the present invention will be further understood upon consideration of the following detailed description of the invention.

DETAILED DESCRIPTION OF THE PRESENTLY PREFERRED EMBODIMENT

In accordance with an embodiment of the present invention, a typical example of the rubber composition has about 30–70% by weight recycled, devulcanized rubber, and the remainder of the composition includes natural or synthetic rubber, carbon black, process oil, silica, activators, process aids, accelerators and sulfur. The devulcanized, recycled rubber is preferably recycled tire rubber. The recycled tire rubber is preferably DE-VULC. DE-VULC is available from STI-K Polymers of America.

A typical embodiment of the invention has the following base composition, in weight percent:

| | |
|---|---|
| Natural Rubber: | 0.230 |
| Carbon Black: | 0.092 |
| Process Oil: | 0.048 |
| Silica: | 0.039 |
| Activators: | 0.014 |
| Process Aids: | 0.018 |
| Accelerators: | 0.016 |
| Sulfur: | 0.005 |
| Recycled Rubber: | 0.538. |

The composition is mixed and rolled into a sheet form using conventional processing equipment and parameters. The composition is then vulcanized using conventional processing equipment and parameters. Vulcanization transforms the rubber from a weak thermoplastic mass without useful mechanical properties into a strong, elastic, tough rubber. Vulcanization is accomplished by applying heat and pressure to the rubber composition, or it can be accomplished without heat by the addition of chemicals such as sulfur chloride. After vulcanization, the rubber composition has a tensile strength of approximately 2000–2350 psi, an elongation of 325–425%, and a Shore A hardness of 45–75. This combination of properties results in a particularly comfortable and desirable feeling rubber composition. The material is particularly suitable when the tensile strength is 2185, the elongation is 377% and the Shore A hardness is 60.

Figure 1A:
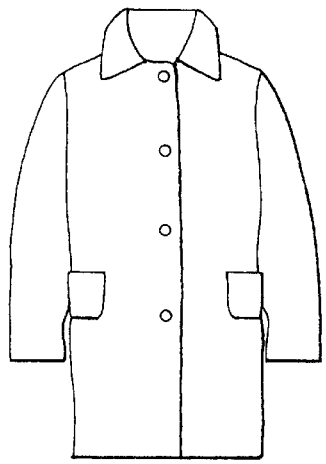
FIGS. 1a–1i show examples of different articles of clothing that can be made from the novel rubber composition.
Figure 1B:
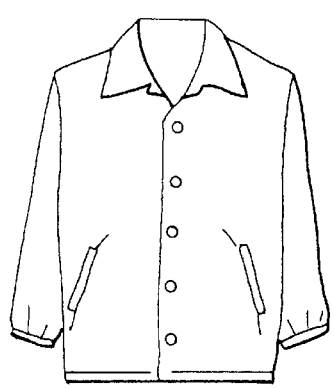
Figure 1C:
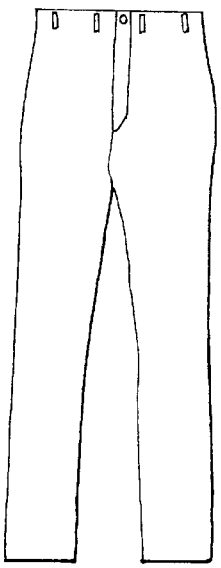
Figure 1D:
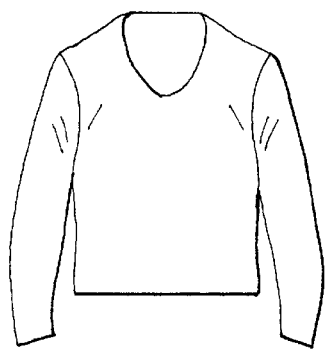
Figure 1E:
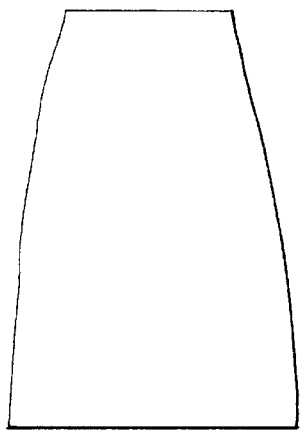
Figure 1F:
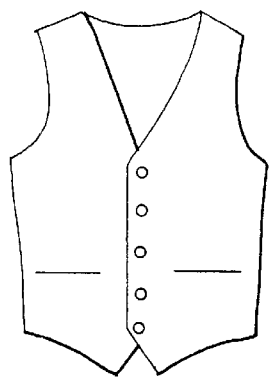
Figure 1G:
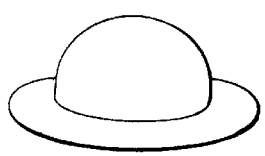
Figure 1H:
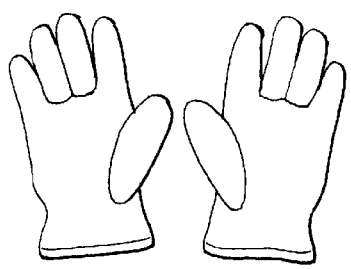
Figure 1I:
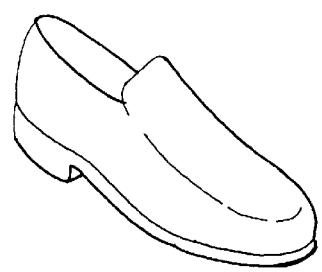
Figure 2A:
FIGS. 2a–2n show examples of different fashion accessories that can be made from the novel rubber composition.
Figure 2B:
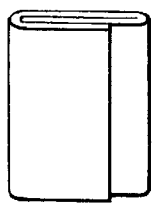
Figure 2C:
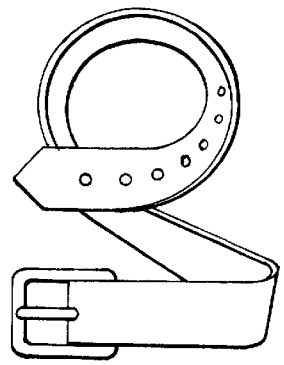
Figure 2D:
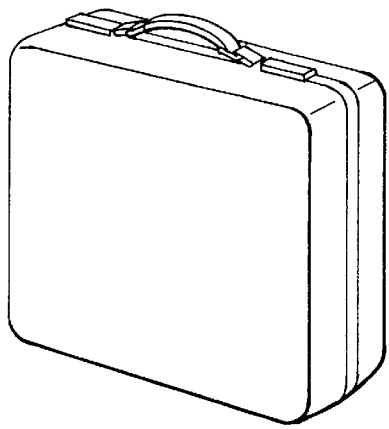
Figure 2E:
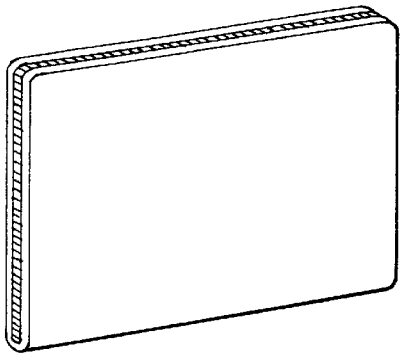
Figure 2F:
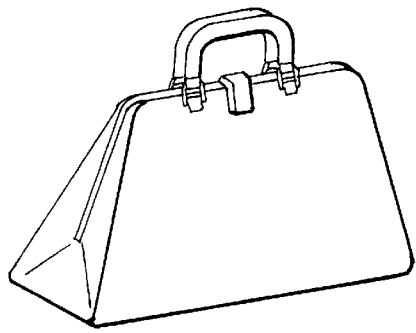
Figure 2G:
Figure 2H:
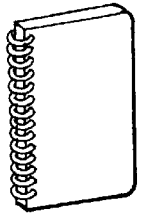
Figure 2I:
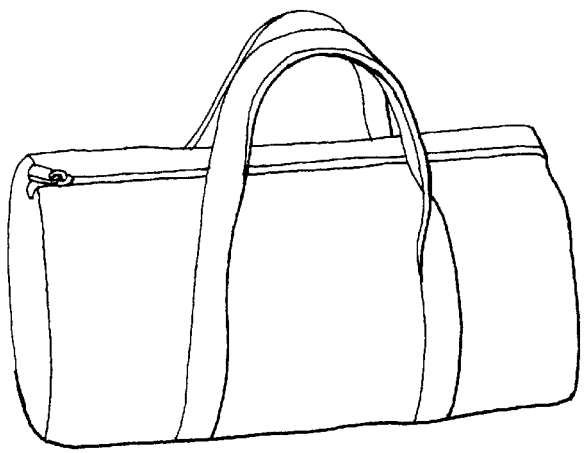
Figure 2J:
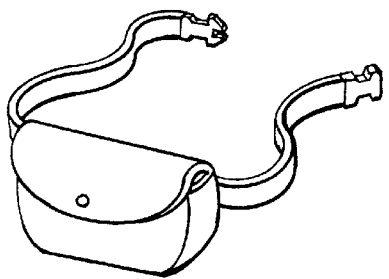
Figure 2K:
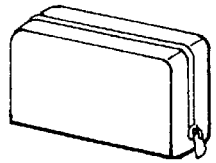
Figure 2L:
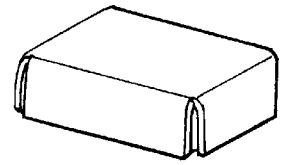
Figure 2M:
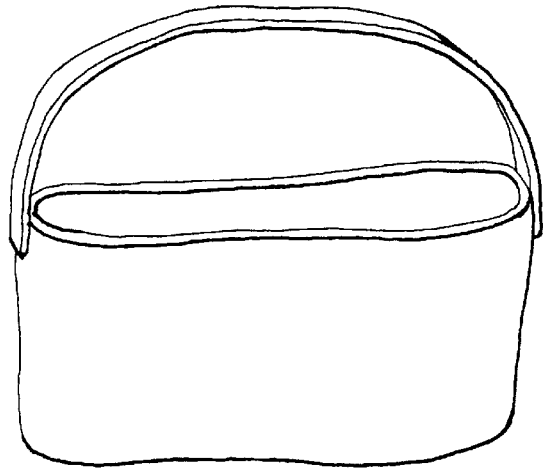
Figure 2N:
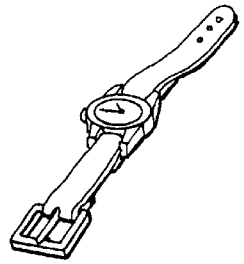

At this point, the rubber is in sheet form and is ready to be cut or patterned into a desired shape. For example, the rubber can be patterned for clothing or fashion accessories. With reference to FIGS. 1a–1i, respectively, the rubber composition is particularly suitable for clothing such as coats, jackets, pants, shirts, skirts, vests, hats, gloves and shoes. Further, with reference to FIGS. 2a–2n, respectively, the rubber composition is particularly suitable for fashion accessories such as purses, wallets, belts, luggage, portfolios, briefcases, backpacks, datebooks/address books, carrying bags, fanny packs, make-up cases, shaving kits, beach bags, and watch bands. The above list of clothing and fashion accessories are only examples of the type of clothing and fashion accessories that the rubber composition is useful for, and is not meant to limit the claims of this patent in any way. Similarly, the particular embodiments disclosed in FIGS. 1 and 2 are only examples of the type of clothing and fashion accessories that the rubber composition is useful for, and is not meant to limit the claims of this patent in any way.

After patterning, the pieces of rubber are ready to be secured into the shape of the final desired product. For example, the rubber pieces can be secured by sewing, riveting, tacking, or gluing. Other procedures for securing the rubber are also available.

The foregoing detailed description has been given for clearness of understanding only, and no unnecessary limitations should be understood therefrom, as modifications will be obvious to those skilled in the art.

What is claimed is:

1. A final, vulcanized rubber composition, that is not a thermoplastic, for use in making clothing and fashion accessories having a tensile strength of 2000–2350 psi, and elongation of 325–425%, and a Shore A hardness of 45–75 and comprising, before vulcanization of said rubber composition, about 30%–70% (by weight) devulcanized, recycled rubber.

2. The rubber composition of claim 1 wherein said devulcanized, recycled rubber comprises substantially recycled tires.

3. The rubber composition of claim 2 wherein said rubber composition further comprises natural or synthetic rubber, carbon black, process oil, silica, activators, process aids, accelerators and sulfur.

4. A method for using a final, vulcanized rubber composition, that is not a thermoplastic, to make clothing and fashion accessories comprising the steps of:

providing a rubber composition consisting essentially of, about 30–70% devulcanized, recycled rubber by weight, and the remainder comprising natural or synthetic rubber, carbon black, process oil, silica, activators, process aids, accelerators and sulfur;

sheeting said rubber composition;

vulcanizing said rubber composition;

cutting said rubber composition after vulcanizing; and securing the rubber composition.

5. The method of claim 4 wherein said rubber composition has a tensile strength of 2000–2350 psi, an elongation of 325–425%, and a Shore A hardness of 45–75.

6. The method of claim 5 wherein said devulcanized, recycled rubber comprises substantially recycled tires.

7. The method of claim 6 wherein said securing comprises sewing.

8. The method of claim 6 wherein said securing comprises riveting.

9. The method of claim 6 wherein said securing comprises tacking.

10. The method of claim 6 wherein said securing comprises gluing.

11. A personal article comprising a final, vulcanized rubber composition, that is not a thermoplastic. said rubber composition before vulcanization consisting essentially of about 30–70% devulcanized, recycled rubber by weight, and the remainder comprising natural or synthetic rubber, carbon black, process oil, silica, activators, process aids, accelerators and sulfur.

12. The personal article of claim 11 wherein said rubber composition has a tensile strength of 2000–2350 psi, an elongation of 325–425%, and a Shore A hardness of 45–75.

13. The personal article of claim 12 wherein said devulcanized, recycled rubber comprises substantially recycled tires.

14. The personal article of claim 13 wherein said personal article is a fashion accessory.

15. The personal article of claim 14 wherein said fashion accessory is a purse.

16. The personal article of claim 14 wherein said fashion accessory is a wallet.

17. The personal article of claim 14 wherein said fashion accessory is a belt.

18. The personal article of claim 14 wherein said fashion accessory is luggage.

19. The personal article of claim 14 wherein said fashion accessory is a portfolio.

20. The personal article of claim 14 wherein said fashion accessory is a briefcase.

21. The personal article of claim 14 wherein said fashion accessory is a backpack.

22. The personal article of claim 14 wherein said fashion accessory is a datebook/address book.

23. The personal article of claim 14 wherein said fashion accessory is a carrying bag.

24. The personal article of claim 13 wherein said personal article is clothing.

* * * * *